(12) United States Patent
Dvorak et al.

(10) Patent No.: US 6,374,605 B1
(45) Date of Patent: Apr. 23, 2002

(54) HYDROSTATIC TRANSMISSION CONTROL WITH PRESSURE FEEDBACK

(75) Inventors: Paul A. Dvorak, Sanford; W. Chris Swick, Raleigh, both of NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/569,395

(22) Filed: May 12, 2000

Related U.S. Application Data

(63) Continuation-in-part of application No. 09/275,163, filed on Mar. 24, 1999.

(51) Int. Cl.$^7$ .................................................. F16D 31/02
(52) U.S. Cl. .......................................... 60/444; 60/452
(58) Field of Search ........................... 60/444, 445, 452

(56) References Cited

U.S. PATENT DOCUMENTS

| | | | | |
|---|---|---|---|---|
| 4,216,656 A | * | 8/1980 | Hamma | 60/452 |
| 4,458,485 A | * | 7/1984 | Seelmann | 60/445 |
| 5,561,979 A | * | 10/1996 | Coutant et al. | 60/448 |

* cited by examiner

*Primary Examiner*—F. Daniel Lopez
(74) *Attorney, Agent, or Firm*—J. W. Burrows

(57) ABSTRACT

A control arrangement is provided to control the output of a hydrostatic transmission in response to a selectable input from an operator. This is accomplished by having a adjustable relief valve connected to the pilot control arrangement that controls the displacement of the variable displacement pump of the hydrostatic transmission. The adjustable relief valve vents a portion of the pilot control pressure being directed to the variable displacement pump in response to the pressure between the variable displacement pump and the fluid motor of the hydrostatic transmission and the setting of the adjustable relief valve by the operator.

11 Claims, 3 Drawing Sheets

HYDROSTATIC TRANSMISSION CONTROL WITH PRESSURE FEEDBACK

This application is a continuation-in-part of application Ser. No. 09/275,163 filed Mar. 24, 1999.

TECHNICAL FIELD

This invention relates generally to the control of a hydrostatic transmission and more specifically to the apparatus for the control of the variable displacement hydraulic pump of the hydrostatic transmission.

BACKGROUND ART

It is well known in the art to control the displacement of a variable displacement pump by controlling a source of pressurized fluid being directed to the displacement controller thereof. In these known systems, the displacement controller is controlled strictly by the pressure being directed thereto in response to operator movement of an input lever. The output speed and torque is normally proportional to the degree of movement of the input lever. In machines having attachments that are being operated independently of the hydrostatic transmission, the forward or reverse movement of the machine during the time that the independent attachment is being used many times causes the independent attachment to not perform in the proper manner. For example, the independent attachment may be forced away or up from its normal intended path due to the forces induced thereon by the forward or reverse movement of the machine being to great or the work tool may stall. It is desirable to have a system that permits the operator to remotely control the pressure in the hydrostatic loop without the use of special tooling while performing required tasks with the machine.

The present invention is directed to overcoming one or more of the problems as set forth above.

DISCLOSURE OF THE INVENTION

In one aspect of the present invention, a control arrangement is provided for use in a fluid system having a power source drivingly connected to a hydrostatic system, a fluid driven work implement, and a source of pressurized pilot fluid, the hydrostatic system having a variable displacement pump, a fluid motor fluidity connected to the variable displacement pump and operative to provide output power to an output. The variable displacement pump has a displacement controller thereon to control the displacement of the variable displacement pump. The control arrangement includes a pilot control arrangement connected to the source of pressurized pilot fluid and operatively connected to the displacement controller of the variable displacement pump. An adjustable relief valve is provided in the control arrangement and is operatively connected to the pilot control arrangement to control the level of pilot pressure being directed to the displacement controller in response to one of the pressure of the fluid between the variable displacement pump and the fluid motor and the pressure of the fluid in the fluid driven work implement.

BEST MODE FOR CARRYING OUT THE INVENTION

Figure 1:
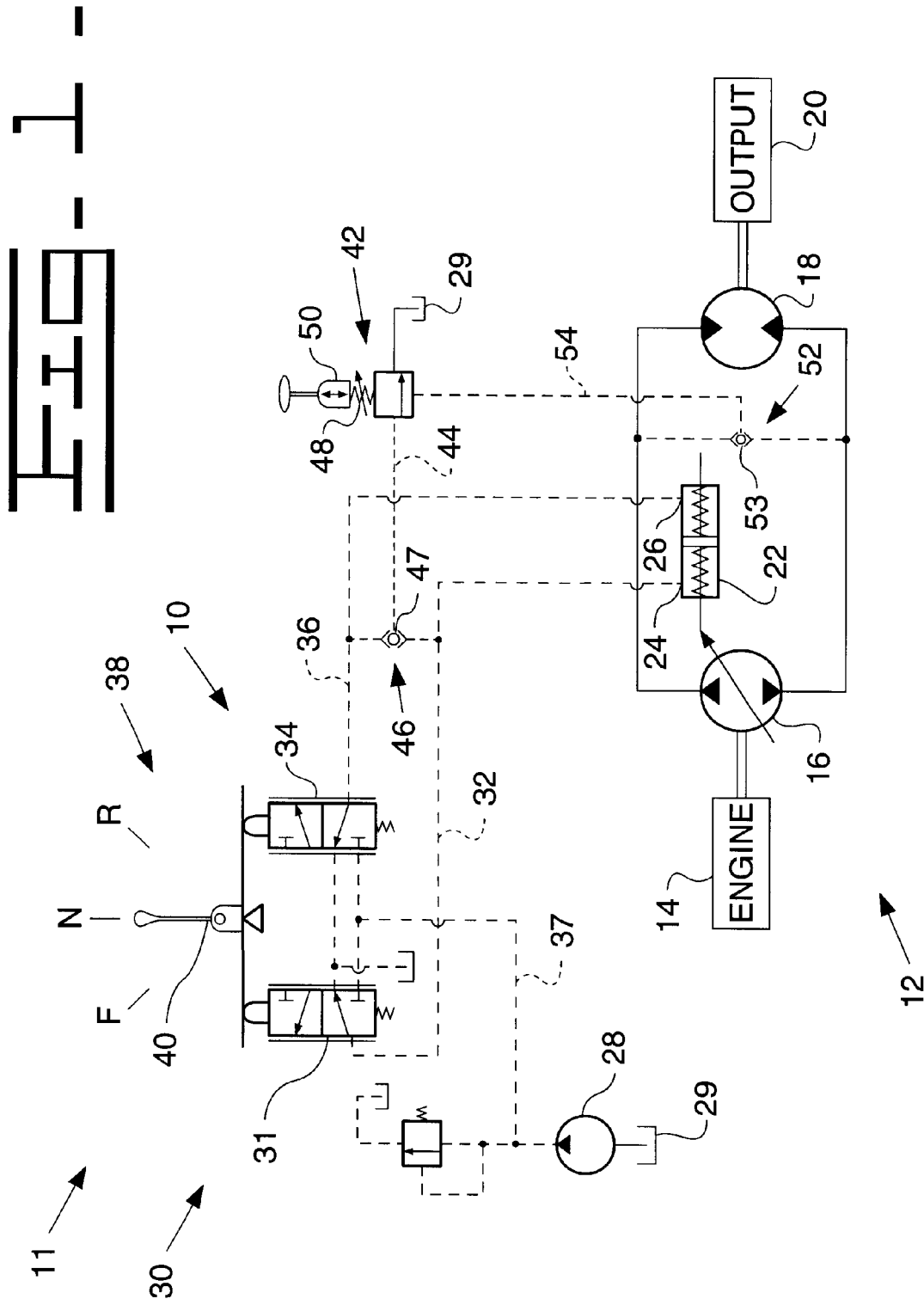
FIG. 1 is a schematic representation of a fluid system incorporating one embodiment of the subject invention.

Referring to the drawings, and more particularly to FIG. 1, a control arrangement 10 for a fluid system 11 having a hydrostatic transmission system 12 is illustrated. The hydrostatic transmission 12 is drivingly connected to a power source 14 and includes a variable displacement pump 16 fluidity connected to a fluid motor 18 that provides power to an output 20. A displacement controller 22 is connected to the variable displacement pump 16 and operative to control the fluid displacement of the variable displacement pump in response to receipt of a pressurized fluid signal. The displacement controller 22 has first and second inlet ports 24,26. A source of pressurized pilot fluid 28 receives fluid from a reservoir 29 and provides pressurized fluid to the displacement controller 22.

The control arrangement 10 includes a pilot control arrangement 30 having a first selectably actuated pilot control valve 31 operatively connected to the first inlet port 24 of the displacement controller 22 through a first conduit 32. The pilot control arrangement 30 also includes a second selectably actuated pilot control valve 34 connected to the second inlet port 26 of the displacement controller 22 through a second conduit 36. A pilot supply conduit 37 connects the source of pressurized pilot fluid to the first and second pilot control valves 31,34.

The first and second pilot control valves 31,34 are selectably actuated by an operator through movement of an input controller 38. In the subject arrangement, a lever mechanism 40 controls the input to the first and second pilot control valves 31,34. Movement of the lever mechanism 40 towards the position "F" strokes the variable displacement pump 16 towards a direction to cause the output 20 to turn in a first direction. This first direction, could be, for example, a forward direction of a machine (not shown). Movement of the lever mechanism 40 towards the "R" position causes the output 20 to move the machine in the reverse direction. It is recognized that the input controller 38 could be an electronic controller without departing from the essence of the subject invention.

The control arrangement 10 also includes an adjustable relief valve 42 that is operative to control the pressure in the first and second conduits 32,36 in response to the pressure between the variable displacement pump 16 and the fluid motor 18. The adjustable relief valve 42 is connected between the reservoir 29 and the first and second conduits 32,36 by a conduit 44 and a first resolver arrangement 46. The first resolver arrangement 46 includes a resolver 47 connected between the conduits 32,36. The adjustable relief valve 42 is biased to a closed position by an adjustable rate spring 48. The rate of the spring 48 is controlled by an adjustment mechanism 50 that is selectably movable by the operator. The adjustable relief valve is movable towards its open position in response to receipt of a signal that is representative of the pressure between the variable displacement pump 16 and the fluid motor 18. In the subject arrangement, a second resolver arrangement 52 determines the highest pressure between the variable displacement pump 16 and the fluid motor 18 and delivers the highest pressure signal to the adjustable relief valve 42 through a conduit 54. The second resolver arrangement 52 includes a resolver 53 connected between the respective lines connecting the variable displacement pump 16 and fluid motor 18.

Figure 2:
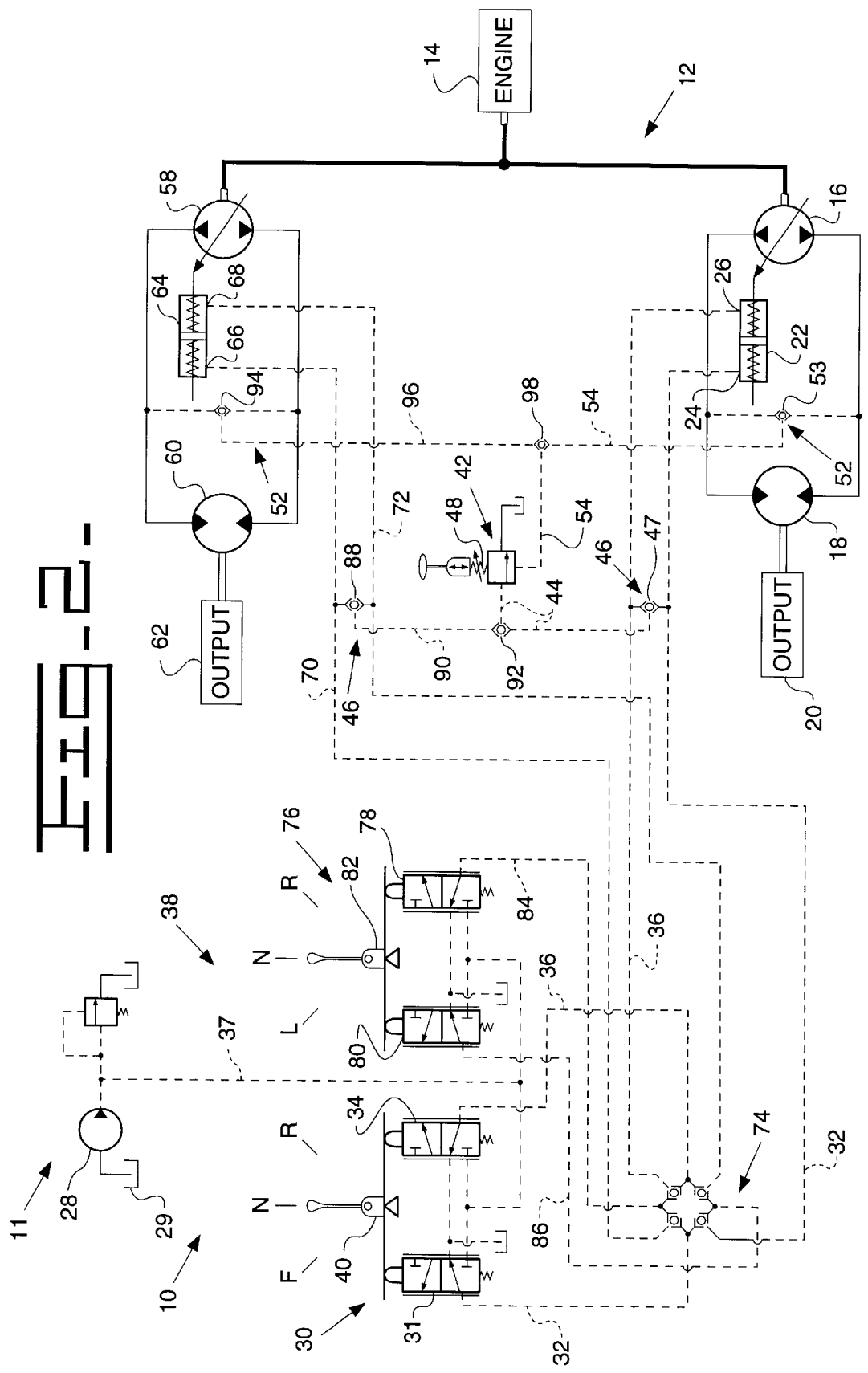
FIG. 2 is a schematic representation of another fluid system incorporating the subject invention.

Referring to FIG. 2, another embodiment of the subject invention is disclosed. In the embodiment of FIG. 2, like element have like element numbers. The output 20 of FIG.

1 controlled the machine or other mechanism in both a forward and reverse direction. The embodiment of FIG. 2 has two different outputs which can individually control two different members such as, two drive wheels (not shown).

The hydrostatic transmission system 12 of FIG. 2 includes a second variable displacement pump 58 drivingly connected to the power source 14 and fluidity connected to a second fluid motor 60 which delivers power to a second output 62. A second displacement controller 64 is connected to the second variable displacement pump 58 and operative to control the displacement of the variable displacement pump 58. The second displacement controller 64 has first and second inlet ports 66,68. The second displacement controller 64 is simultaneously controlled along with the first displacement controller 22 by the input controller 38. The first and second inlet ports 66,68 of the second displacement controller 64 are respectively connected via conduits 70,72 and the conduits 32,36 through a resolver network 74 to the first and second pilot control valves 31,34.

The control arrangement 10 includes a second pilot control arrangement 76. The second pilot control arrangement 76 has first and second pilot control valves 78,80 that are selectably actuated by a second lever mechanism 82. Conduits 84,86 respectively connect the associated first and second pilot control valves 78,80 to the first and second displacement controllers 22,64 through the resolver network 74 in order to vary the output relationship between the first and second outputs 20,62. In machines in which the first and second outputs 20,62 are connected to right and left drive wheels (not shown), the machine can be steered accordingly. It is recognized that only the higher pressure signal from respective ones of the pilot control valves 31,34,78,80 is directed through the appropriate ones of the conduits 32,36, 70,72 leading from the resolver network 74 to the displacement controllers 22,64.

The first resolver arrangement 46 connects the highest pressure signal in the conduits 70,72 to the adjustable relief valve 42. In the subject embodiment, the first resolver arrangement 46 also includes a second resolver 88 connected between the conduits 70,72, a conduit 90 and a third resolver 92 connecting the conduit 90 to the conduit 44 leading to the adjustable relief valve 42.

The second resolver arrangement 52 connects the highest pressure between the second variable displacement pump 58 and the fluid motor 60 to the adjustable relief valve 42. In the subject embodiment, the second resolver arrangement 52 also includes a second resolver 94, a conduit 96 and a third resolver 98 connecting the conduit 96 to the conduit 54 leading to the adjustable relief valve 42.

Figure 3:
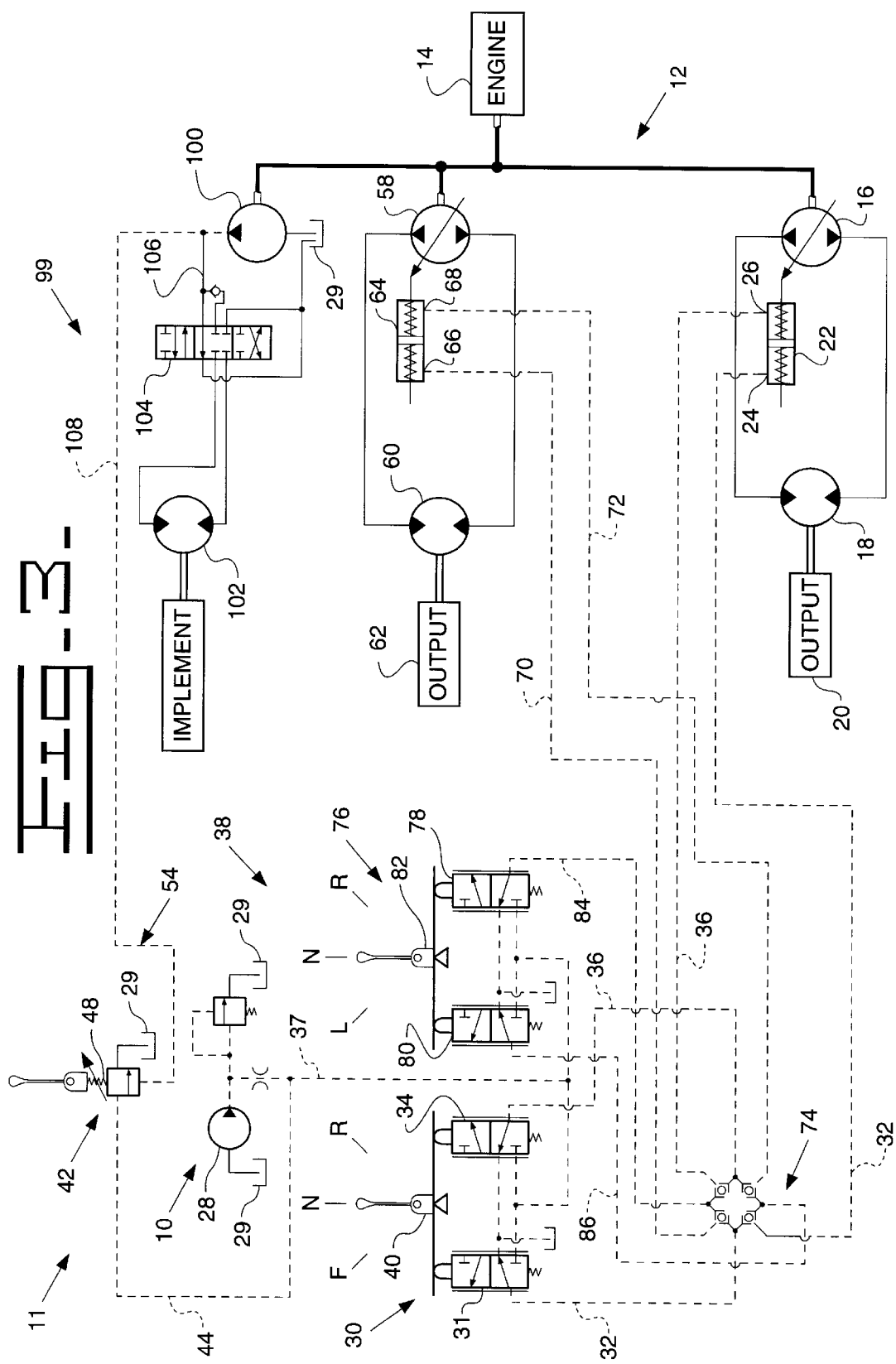
FIG. 3 is a schematic representation of yet another fluid system incorporating the subject invention.

Referring to FIG. 3, another embodiment of the control arrangement 10 for the fluid system 11 is illustrated. In the embodiment of FIG. 3, like elements have like element numbers. The embodiment of FIG. 3 is similar to the embodiment of FIG. 2. However, the first and second resolver arrangements 46 and 52 of FIGS. 1 & 2 are not needed in the embodiment of FIG. 3.

The embodiment of FIG. 3 further includes an implement system 99 having a source of pressurized implement fluid, such as a pump 100, that is being driven by the power source 14 in a conventional manner and the pump 100 is selectively connected to a fluid driven work implement 102 through a directional control valve 104. A supply conduit 106 connects the pump 100 to the directional control valve 104.

The adjustable relief valve 42 of FIG. 3 is operative to control the pressure in the respective conduits 32,36,70,72 by controlling the pressure of the source of pressurized pilot fluid 28 in the pilot supply conduit 37 in response to the pressure of the fluid in the fluid driven work implement 102. The adjustable relief valve 42 is connected by the conduit 44 between the reservoir 29 and the pilot supply conduit 37. The adjustable relief valve 42 is biased to a closed position by the force of the adjustable rate spring 48 and is adjustable in the same manner as that described with respect to FIG. 1. The adjustable relief valve 42 is moveable towards its open position in response to receipt of a signal that is representative of the pressure of the fluid driving the fluid driven work implement 102. A signal conduit 108 is connected between the conduit 106 and the adjustable relief valve 42 and is operative to direct the pressure of the fluid driving the fluid driven work implement 102 to the adjustable relief valve 42.

It is recognized that various arrangements could be used in the subject control arrangement. For example, the pressure signals could be resolved electronically and an electrical signal representative thereof could be delivered to the appropriate actuator/port. Likewise, the fluid motor could be a variable displacement fluid motor and its displacement could be controlled with the subject control arrangement 10. Additionally, the first and second resolver arrangements 46,52 of FIGS. 1 and 2 could be utilized in FIG. 3 in cooperation with the adjustable relief valve 42 to control the pressure in the respective conduits 32,36,70,72. Likewise, the connection of the adjustable relief valve 42 of FIG. 3 to the pilot supply conduit 37 could be utilized in either FIG. 1 or FIG. 2 without departing from the essence of the subject invention. It is also envisioned that the subject invention covers the possibility that one could resolve the signals from the fluid driven work implement 102 and the hydrostatic transmission 12 and direct the higher of the two to the adjustable relief valve 42.

Industrial Applicability

During the operation of the hydrostatic transmission of FIG. 1, when the operator moves the lever mechanism 40 towards the "F" position, pressurized pilot fluid is directed to the first inlet port 24 of the displacement controller 22. The pressurized fluid in the inlet port 24 moves the displacement controller 22 in one direction to move the variable displacement pump 16 from a zero displacement position towards a maximum flow position. Flow from the variable displacement pump 16 forces the fluid motor 18 to flow in a first direction. In a machine having a single pump/motor arrangement, the output 20 causes the machine to move in one direction. The output 20 could be, for example, a differential mechanism that in turn deliver power to two separate wheels or tracks.

The pressure of the fluid between the variable displacement pump 16 and the fluid motor 18 is directly related to the operating resistance of the machine. For example, if an attachment is being used for cutting, grinding, or trenching of a material, the forward motion of the machine may be resisted by the efforts of the attachment. The forward motion of the machine could cause the attachment to stall or operate in an undesired manner. Consequently, it is desirable to control the force of the forward efforts of the machine in relationship to the operating efforts of the output or the attachment. Since the force of the machine in the forward direction is directly associated with the pressure in the line between the variable displacement pump 16 and the motor 18, the pressure in the line thereof needs to be selectably controlled by the operator.

In the subject arrangement, the adjustable relief valve 42 is operative to control the pressure between the variable displacement pump 16 and fluid motor 18. Since the displacement controller 22 of the variable displacement pump 16 is controlled by the pressurized pilot fluid, the level of the pressure being directed to the displacement controller 22 can be selectably varied by the adjustable relief valve 42. If the attachment is not operating as desired due to the high forces being exerted thereon from the forward motion of the machine, the operator can reduce the force on the spring 48 of the adjustable relief valve 42. The pressure of the fluid in the conduit 54 acts to open the adjustable relief valve 42 to vent pressurized fluid from the conduit 32 through the conduit 44. A reduction of pressure in the conduit 32 permits the displacement controller 22 to reduce the displacement of the variable displacement pump 16 thus lowering the high forces on the attachment that was resulting from the forward motion of the machine. The adjustable relief valve 42 then automatically controls the forward force of the machine.

If it is desired to operate the machine in the reverse direction, the operator moves the lever mechanism 40 towards the "R" position. The resulting pressurized pilot fluid being directed to the second inlet port of the displacement controller 22 changes the displacement of the variable displacement pump 16 in the opposite direction. The fluid from the variable displacement pump 16 then forces the fluid motor 18 to turn in the opposite direction thus turning the output 20 in the reverse direction. If the forces acting on the output or attachment is to high the adjustable relief valve 42 functions as described above. As previously noted, the operator can selectively change the force acting on the spring 48 of the adjustable relief valve 42 to achieve the desired operation of the output 20 or any attachment.

Referring to the operation of FIG. 2, the operation of the subject invention is substantially the same. The major difference between the hydrostatic transmission system 12 of FIG. 2 as compared to that of FIG. 1 is that the system of FIG. 2 has two separate outputs 20,62 driven by two separate pump/motor arrangements. The second displacement controller 64 of the second variable displacement pump 58 is controlled at the same time as the first displacement controller 22 by the same first and second pilot control valves 31,34. The resolver network 74 functions to simultaneously direct the pressurized pilot fluid from the first and second pilot control valves 31,34 to each of the respective displacement controllers 22,64. The first resolver arrangement 46 functions to direct the highest pilot pressure signal to the adjustable relief valve 42. Likewise, the second resolver arrangement 52 directs the highest pressure signal from the lines between the respective variable displacement pumps 16/58 and fluid motors 18/60 to the adjustable relief valve 42 to act against the spring 48 to urge the adjustable relief valve 42 towards its open position as previously set forth with respect to the operation of FIG. 1.

The second pilot control arrangement 76 functions to provide a difference between the outputs of the first and second outputs 20,62. In a machine wherein the first and second outputs are connected to respective drive wheels or tracks, the machine may be steered by varying the relative speeds of the first and second outputs 20,62. The signals from the second control arrangement 76 is directed to the appropriate displacement controllers 22,64 through the resolver network 74. It is recognized that the resolver network 74 functions to determine which pilot signal is the higher one and directs only the appropriate higher one to the associated displacement controller 22/64.

Referring to the operation of the embodiment of FIG. 3, the operation of the hydrostatic transmission 12 to move the machine as set forth with respect to FIG. 2 is the same as that herein. However, in the subject embodiment, the implement system 99 is included. During operation of the fluid driven work implement 102, the operating pressure thereof is delivered through the conduit 108 and acts on the adjustable relief valve 42 against the bias of the adjustable rate spring 48. The operating pressure of the fluid driven work implement 102 is directly related to the load encountered therein. When there is no forward or reverse movement of the machine, the load is not affected by machine movement. However, in various work functions, the machine is moved in a forward or reverse direction so that the fluid driven work implement 102 is continuously being moved into engagement with the area or item being worked. Consequently, if the forward or reverse movement of the machine is too great, the fluid pressure within the fluid driven work implement 102 may become to great. In the subject embodiment, the adjustable relief valve 42 is adjusted by the operator to a predetermined level as dictated by the area or item being worked and as the pressure being generated by the fluid driven work implement 102 increases, the pressure therein is being directed through the conduit 108 and acts on the adjustable relief valve 42. Once the pressure of the fluid in the fluid driven work implement 102 exceed the opposing force of the adjustable rate spring 48, the adjustable relief valve 42 opens to vent fluid from the conduit 44 to the reservoir 29 thus lowering the pressure in the pilot supply conduit 37. A reduction of the pressure in the pilot supply conduit 37 automatically reduces the pressure of the fluid acting within the displacement controllers 22,64. A reduction of the pressure within the displacement controllers 22,64 automatically reduces the displacement of the hydrostatic transmission 12 which reduces the rate of the forward or reverse travel of the machine. By reducing the travel rate of the machine, the rate that the fluid driven work implement 102 is engaging the work is reduced. A reduction in the rate that the fluid driven work implement 102 is engaging the work results in a reduction in the pressure of the fluid driving the fluid driven work implement 102.

In view of the foregoing, it is readily apparent that the control arrangement 10 for the hydrostatic system 12 set forth in both FIGS. 1 and 2 provides an arrangement that is effective to permit the operator with the ability to control the forward or reverse motion of the machine by controlling the pressure of the fluid being directed to the displacement controller 22/64 in response to the pressure in the hydrostatic transmission system 12. Likewise, the embodiment of FIG. 3 serves to provide a control arrangement that automatically controls the forward or reverse travel rate of the machine in response to the pressure of the fluid in the fluid driven work implement 102.

Other aspects, objects and advantages of the invention can be obtained from a study of the drawings, the disclosure and the appended claims.

What is claimed is:

1. A control arrangement for a fluid system having a power source drivingly connected to a hydrostatic transmission system, a fluid driven work implement, and a source of pressurized pilot fluid, the hydrostatic transmission system having a variable displacement pump fluidity connected to a fluid motor and operative to provide output power to an output, the variable displacement pump having a displacement controller thereon, the control arrangement comprising:

a pilot control arrangement connected to the source of pressurized pilot fluid and operatively connected to the displacement controller of the variable displacement pump; and a selectively adjustable relief valve operatively connected to the pilot control arrangement to control the level of pilot pressure being directed to the displacement controller in response to one of the pressure of the fluid between the variable displacement pump and the fluid motor and the pressure of the fluid in the fluid driven work implement.

2. The control arrangement of claim 1 wherein the pilot control arrangement includes a first selectably actuated pilot control valve fluidity connected to the displacement controller of the variable displacement pump by a first conduit and the adjustable relief valve is connected to the first conduit between the pilot control valve and the displacement controller of the variable displacement pump.

3. The control arrangement of claim 2 wherein the adjustable relief valve is selectably adjusted by an operator.

4. The control arrangement of claim 3 wherein the displacement controller has first and second inlet ports with the first inlet port connected to the first pilot control valve, the pilot control arrangement further includes a second pilot control w valve connected to the second inlet port of the displacement controller through a second conduit, and the adjustable relief valve is connected to the first and second conduits through a resolver arrangement.

5. The control arrangement of claim 4 wherein the hydrostatic transmission system includes a second variable displacement pump having a displacement controller and being fluidity connected to a second fluid motor to provide power to a second output, the displacement controller of the second variable displacement pump has first and second inputs with the first input of the displacement controller of the second variable displacement pump being connected to the first pilot control valve through the first conduit and the second input of the displacement controller of the second variable displacement pump being connected to the second pilot control valve through the second conduit, and the pressure of the fluid between the second variable displacement pump and the second fluid motor being connected to the adjustable relief valve through a second resolver arrangement.

6. The control arrangement of claim 5 including a second pilot control arrangement connected to the source of pressurized pilot fluid and operatively connected to the respective displacement controllers of the first and second variable displacement pumps to vary the output power between the first and second fluid motors.

7. The control arrangement of claim 6 wherein the first and second pilot control valves are connected to the respective displacement controllers of the first and second variable displacement pumps through a resolver network located between the first and second pilot control valves and the first and second resolver arrangements.

8. The control arrangement of claim 1 wherein the pilot control arrangement is connected to the source of pressurized pilot fluid and includes a selectably actuated pilot control valve fluidily connected to the displacement controller of the variable displacement pump by a conduit and the adjustable relief valve is connected to the source of pressurized pilot fluid conduit between the source of pressurized pilot fluid and the displacement controller of the variable displacement pump.

9. The control arrangement of claim 8 including a source of pressurized implement fluid connected to the fluid driven work implement and the adjustable relief valve is operative in response to receipt of pressurized fluid from a connection between the source of pressurized implement fluid and the fluid driven work implement.

10. The control arrangement of claim 9 wherein the adjustable relief valve is connected to the source of pressurized pilot fluid conduit between the source of pressurized pilot fluid and the pilot control arrangement.

11. The control arrangement of claim 10 wherein the hydrostatic transmission system includes a second variable displacement pump having a displacement controller and being fluidity connected to a second fluid motor to provide power to a second output, the displacement controller of the second variable displacement pump has first and second inputs with the first input connected to the first pilot control valve through the first conduit and the second input being connected to the second pilot control valve through the second conduit, and a second pilot control arrangement connected to the source of pressurized pilot fluid and operatively connected to the respective displacement controllers of the first and second variable displacement pumps to vary the output power between the first and second fluid motors.

* * * * *

UNITED STATES PATENT AND TRADEMARK OFFICE
CERTIFICATE OF CORRECTION

PATENT NO. : 6,374,605 B1
DATED : April 23, 2002
INVENTOR(S) : Paul A. Dvorak et al.

It is certified that error appears in the above-identified patent and that said Letters Patent is hereby corrected as shown below:

Column 6,
Line 57, "fluidity" should be deleted and insert -- fluidily --.

Column 7,
Line 19, "w" should be deleted.
Line 26, "fluidity" should be deleted and insert -- fluidily --.

Signed and Sealed this

Twenty-second Day of October, 2002

Attest:

Attesting Officer

JAMES E. ROGAN
Director of the United States Patent and Trademark Office